United States Patent [19]

Heimberg et al.

[11] Patent Number: 5,209,977
[45] Date of Patent: May 11, 1993

[54] CROSSLINKABLE ETHYLENE COPOLYMER POWDERS AND PROCESSES

[75] Inventors: Manfred Heimberg, Cincinnati; Daniel J. Ondrus, West Chester, both of Ohio

[73] Assignee: Quantum Chemical Corporation, New York, N.Y.

[21] Appl. No.: 797,834

[22] Filed: Nov. 26, 1991

[51] Int. Cl.$^5$ .................... C08F 255/02; C08F 230/08
[52] U.S. Cl. .................... 428/402; 526/279; 525/288; 528/481
[58] Field of Search .................... 526/279; 525/288; 428/402; 528/481; 524/547, 378

[56] References Cited

U.S. PATENT DOCUMENTS

| | | | |
|---|---|---|---|
| 3,225,018 | 12/1965 | Zutty | 528/481 |
| 3,392,156 | 7/1968 | Donaldson | 526/227 |
| 3,422,049 | 1/1969 | McClain | 526/326 |
| 3,432,483 | 3/1969 | Peoples et al. | 528/494 |
| 3,646,155 | 2/1972 | Scott | 525/288 |
| 3,746,681 | 7/1973 | McClain | 524/585 |
| 4,252,969 | 2/1981 | Broering et al. | 528/492 |
| 4,440,908 | 4/1984 | McClain | 525/196 |
| 4,707,520 | 11/1987 | Keogh | 525/245 |

OTHER PUBLICATIONS

F. W. Billmeyer, Jr., Text Book of Polymer Science, 3rd Ed., Wiley, New York 1984; pp. 198-203.

Primary Examiner—Joseph L. Schofer
Assistant Examiner—M. Nagumo
Attorney, Agent, or Firm—Kenneth D. Tremain; Gerald A. Baracka

[57] ABSTRACT

The present invention relates to crosslinkable microfine ethylene copolymer powders which are substantially spherical in shape and range in size from about 10 up to about 500 microns and to the process of crosslinking the powders to reduce their melt flow rate. The powders are crosslinked by contacting with water in the presence of a silanol condensation catalyst at temperatures from ambient up to about 110° C. The reduction in melt flow rate is accomplished without substantially changing the powder characteristics, i.e., particle size and particle size distribution.

9 Claims, No Drawings

CROSSLINKABLE ETHYLENE COPOLYMER POWDERS AND PROCESSES

BACKGROUND OF THE INVENTION

1. Field of the Invention

The present invention relates to microfine ethylene copolymer powders which are crosslinkable and wherein the powder particles are spherical or substantially spherical in shape. The invention also relates to a process for producing and crosslinking the polymer powders.

2. Description of the Prior Art

The use of thermoplastic resin powders is well documented in the prior art. For example, powdered thermoplastic resins in dry form have been used to coat articles by dip coating in either a static or fluidized bed and by powder coating. Powders can also be applied in dispersed form, by roller coating, spray coating, slush coating, and dip coating substrates such as metal, paper, paperboard, and the like. Powders are also widely employed for conventional powder lining and powder molding processes, e.g., rotational molding. Still other applications for powders include use as paper pulp additives; mold release agents; additives to waxes, paints, caulks, and polishes; binders for non-woven fabrics; etc.

Besides the physical properties of the powder, which are dictated by the resin being used, the size and shape of the particles are the other major properties which influence the selection of a powder for various applications. These latter properties are primarily a function of the process by which the powders are prepared, which can include mechanical grinding, solution processes and dispersion processes. Particle size is determined using U.S. Standard Sieves or light scattering techniques and, depending on the method used, will be reported in mesh size or microns. The inverse relationship between the sieve size (mesh number) and particle size (in microns) is well documented and conversion tables are available The shape of the particles is ascertained from photomicrographs of the powders. Particle shape has a marked influence on the bulk density of the powder and its handling properties.

For most effective fluidization and dry spraying, it is generally considered advantageous to use powders which have a fairly narrow particle size distribution and wherein the particles are spherical in shape. Powders produced by mechanical grinding or pulverization, which are typically irregular in shape and generally have quite broad particle size distributions, are not well suited for fluidization and dry spraying. While the particles of powders produced by solution processes are less irregular than those obtained by mechanical means, they are still not spherical.

Powders obtained using dispersion techniques, such as those described in U.S. Pat. Nos. 3,422,049 and 3,746,681, wherein the particles produced are spherical in shape and fall within a relatively narrow size range are most advantageously employed for fluidization and dry spraying. These processes involve dispersing a molten synthetic organic polymeric thermoplastic resin in about 0.8 to 9 arts by weight of water per part of resin in the presence of from about 2 to 25 parts by weight per 100 parts of resin of a water-soluble block copolymer of ethylene oxide and propylene oxide having a molecular weight above about 3500 and containing at least about 50% by weight of ethylene oxide and in the absence of an organic solvent for the polymer. The fine dispersion which is produced is then cooled to below the softening temperature of the resin to obtain the powder.

A continuous process for the preparation of finely divided polymer particles is disclosed in U.S. Pat. No. 3,432,483. The process comprises the sequential steps of feeding to the polymer, water and a water-soluble block copolymer of ethylene oxide and propylene oxide surfactant into a dispersion zone; vigorously agitating the mixture under elevated temperature and pressure to form a dispersion of the molten polymer; withdrawing a portion of the dispersion and cooling to a temperature below the melting point of said polymer to form solid, finely divided polymer particles in the dispersion; reducing the pressure of said cooled dispersion to atmospheric pressure; separating the solid polymer particles from the surfactant solution phase and washing; drying the washed polymer particles; and recovering dry, finely divided powder.

While it is possible to produce a wide range of fine powders using such procedures, the method is not adaptable for use with all resins. As the melt index of a resin approaches 1, it becomes increasingly difficult to achieve the type of dispersion necessary to form fine powders. Dispersions having droplets of the size necessary for the production of fine powders cannot be formed with fractional melt flow rate resins, i.e., resins having a melt index less than 1. This is believed to be due, in part, to the high molecular weights of such resins. The relationship of melt flow rate to molecular weight and the inability to form dispersions suitable for the production of fine powders with low melt flow rate resins is discussed in U.S. Pat. No. 3,746,681.

It would be advantageous if fine powders of low melt flow rate resin powders could be produced utilizing a ispersion process, particularly if the particles had a relatively narrow particle size distribution and were spherical in shape. Coatings obtained using such powders would be expected to have improved thermal stability, improved creep resistance, improved chemical resistance and other desirable properties. A process is disclosed in our copending application Ser. No. 784,862, filed Oct. 30, 1991, for producing microfine fractional melt flow rate powders from olefin copolymers. For the process, an olefin copolymer resin having a melt flow rate greater than 1 is dispersed and the melt flow rate of the resin is then lowered during the powder-forming process.

The process of application Serial No. 784,862 pending involves combining an olefin copolymer having a melt index greater than 1 with 4 to 50 percent, based on the weight of the olefin copolymer, of a nonionic surfactant which is a block copolymer of ethylene oxide and propylene oxide, 0.001 to 10 percent, based on the weight of the olefin copolymer, of a catalyst selected from the group consisting of organic bases, mineral or carboxylic acids, organic titanates and complexes or carboxylates of lead, cobalt, iron, nickel and tin, and a polar liquid medium which is not a solvent for the olefin copolymer and which does not react with any of the foregoing ingredients under the conditions employed, the weight ratio of the polar liquid medium to the olefin copolymer ranging from 0.8:1 to 9:1; heating the mixture to a temperature above the melting point of the olefin copolymer; dispersing the mixture to form droplets of the desired size; maintaining the dispersion for a period of time sufficient to achieve the desired reduction of the melt index; cooling the dispersion to below the melting point of the olefin copolymer; and recovering the olefin copolymer powder. Olefin copolymers employed for the process of the invention are derived from $C_{2-8}$ α-olefins and unsaturated alkoxysilanes, e.g., vinyltrialkoxysilanes.

Ethylene/vinylalkoxysilane copolymers are known. They are disclosed in U.S. Pat. Nos. 3,225,018 and 3,392,156. In U.S. Pat. No. 3,392,156 it is also disclosed that the ethylene/vinyltrialkoxysilane copolymers can be used in finely divided form where the copolymer has an average size of less than about 10 mesh and preferably in the range of about 150 to 2000 microns. While the reference states that the finely divided material may be prepared by mechanical grinding, solution or dispersion techniques or other methods, no details are provided. Furthermore, it is a requirement of the process that the products be mechanically worked to obtain a reduction of melt index and an increase in stress cracking resistance. Melt indexes obtained after mechanical working range from 7.95 to zero.

While the "one-step" procedure for producing microfine fractional melt flow rate powders disclosed in our above-identified copending application is highly useful, it would be advantageous to have a process whereby the melt flow rate of polymer powders could be reduced independent of the powder forming operation. This would enable processors to "customize" the melt flow rate of the powders to their specific application. It could also provide better control of the crosslinking. By having the crosslinking take place outside the powder-forming reactor, fouling or corrosion of the primary reactor caused by the presence of crosslinking catalysts could be avoided. It would be particularly useful if the melt flow reduction could be performed on the powders without substantially changing the particle size or particle size distribution.

SUMMARY OF THE INVENTION

We have now developed microfine ethylene copolymer powders which are crosslinkable. The particles of these crosslinkable powders are spherical or substantially spherical in shape, typically with 80 percent or more of the particles ranging in size from about 10 up to about 500 microns. The ability to crosslink the powders provides a convenient means for reducing the melt flow rate of the powder and in those cases where it is desired, makes it possible to produce fractional melt flow rate powders. The crosslinking and reduction in melt flow rate is accomplished without substantially changing the shape of the powder particles, the average particle size, or particle size distribution. The ability to crosslink microfine powders makes it possible for formulators to customize melt flow rates to meet their specific requirements.

The process of the invention comprises first forming an olefin copolymer powder of the desired particle shape and size utilizing dispersion techniques known to the art. This necessarily requires that the olefin copolymer used has a melt flow rate greater than 1 since it is not possible to adequately disperse resins having melt flow rates lower than 1 and to produce acceptable powders. The formed powder is subsequently contacted with moisture and a catalyst to reduce the melt flow rate to the desired level. In a particularly useful embodiment of the invention, the crosslinking and melt flow reduction are accomplished by suspending the powder in an aqueous medium containing the catalyst and contacting at an elevated temperature below the melt point of the polymer for a period of time sufficient to effect the desired degree of crosslinking and melt flow reduction. The olefin copolymer powder is then recovered by conventional procedures.

Olefin copolymers employed for the process of the invention are derived from $C_{2-8}$ α-olefins and unsaturated alkoxysilanes of the formula

$$R-Si(R^*)_n(Y)_{3-n}$$

where R is an ethylenically unsaturated hydrocarbon radical having from 2 to 6 carbon atoms, $R^*$ is a hydrocarbon radical having from 1 to 10 carbon atoms, Y is an alkoxy group having from 1 to 4 carbon atoms and n is an integer from 0 to 2. The unsaturated alkoxysilane may be copolymerized with the α-olefin or grafted onto an α-olefin homopolymer. The olefin copolymers may additionally have a vinyl ester of a $C_{2-6}$ aliphatic carboxylic acid, a $C_{1-6}$ alkyl acrylate or a $C_{1-6}$ alkyl methacrylate polymerized with the α-olefin and unsaturated alkoxysilane. Vinyltrialkoxysilanes are particularly useful unsaturated alkoxysilanes.

Catalysts employed for the process include organic bases, mineral acids, $C_{2-22}$ carboxylic acids or anhydrides, organic titanates and complexes or carboxylates of lead, cobalt, iron, nickel, zinc and tin.

DETAILED DESCRIPTION OF THE INVENTION

This invention relates to crosslinkable powders of olefin copolymer resins wherein the particles are spherical or substantially spherical in shape and fall within a relatively narrow particle distribution range. Upon crosslinking, the melt flow rate of the resin powders is reduced. The melt flow rate reduction is accomplished without substantially changing the character of the powder.

For this invention the terms melt index and melt flow rate are used interchangeably and these values are expressed in grams/10 minutes and determined in accordance with ASTM D1238. The term fractional melt flow rate refers to melt flow rates which are less than 1.

The ability to produce useful fine powders which can subsequently be crosslinked to reduce the melt flow rate of the powder and, if desired, produce a resin powder with a melt flow rates less than 1 is highly advantageous. It is even more desirable if the crosslinkable powders are comprised of particles which are spherical or substantially spherical in shape and range in size from about 10 microns up to about 500 microns. Small particle size powders of this type are sometimes referred to as microfine powders. Yet another significant aspect of the invention is the unexpected ability to crosslink the powders and reduce the melt flow rate without significantly changing the powder characteristics, i.e., average particle size and particle size distribution.

The ability to produce microfine powders with melt flow rates less than 1 is particularly advantageous in view of the inability to form acceptable powder dispersions with such resins. Dispersions with droplets of the requisite size to produce fine powders are not readily produced using resins with fractional melt flow rates. Fractional melt flow rate resin powders produced by grinding in solution processes produce particles which are not spherical and which can have a broad size distribution thus limiting their utility for fluidization and spray coating operations.

For the process of this invention, powders of olefin copolymer resins which are readily dispersible using conventional dispersion techniques, i.e., which have melt flow rates greater than 1, are first produced. These powders are produced using known procedures such as those of U.S. Pat. Nos. 3,422,049, 3,432,483 and 3,746,681, details of which are incorporated herein by reference thereto. Olefin copolymers having an unsaturated alkoxysilane incorporated therein by copolymerization or grafting are employed for this invention.

For the powder-forming process, the olefin copolymer is charged to the reactor with a polar liquid medium and a nonionic surfactant and a dispersion is formed in accordance with conventional dispersing procedures known to the art. The dispersing apparatus may be any device capable of delivering sufficient shearing action to the mixture at elevated temperature and pressure. Conventional propeller stirrers designed to impart high shear commercially available for this purpose can be used. The reactor may also be equipped with baffles to assist in dispersion. The particle size and distribution of particles are dependent on the shearing action which, in turn, is related to the stirrer design and rate of stirring. Agitation rates can vary over wide limits but the speed of the stirrer will usually be controlled so that the tip speed is between about 500 and 3500 ft/min and, more commonly, 750 and 3000 ft/min. A higher tip speed is generally required for batch operation, usually 2500–3000 ft/min. Tip speeds for continuous procedures will most generally be between 750 and 2500 ft/min.

The dispersion process is typically conducted in an autoclave since this permits the process to be conducted at elevated temperature and pressure. In the usual batch conduct of the process, all of the ingredients are charged to the autoclave and the mixture is heated to a temperature above the melting point of the olefin copolymer. While the temperature will vary depending on the specific copolymer used, it will typically range from about 90° C. to 250° C. Since the fluidity of polymers is temperature related, it may be desirable to carry out the process at temperatures substantially above the melting point of the olefin copolymer to facilitate dispersion formation. Stirring is commenced after the desired temperature is reached. Stirring is continued until a dispersion of the desired droplet size is produced. This will vary depending on the copolymer being used, the temperature and amount and type of surfactant, and other process variables but generally will range from about 5 minutes to about 2 hours. Most generally, the stirring is maintained for a period from 10 to 30 minutes.

A polar liquid medium which is not a solvent for the olefin copolymer is employed to form the dispersions. These polar mediums are hydroxylic compounds and can include water, alcohols, polyols and mixtures thereof. The weight ratio of the polar liquid medium to olefin copolymer ranges from about 0.8:1 to about 9:1 and, more preferably, from 1:1 to 5:1. It is particularly advantageous to use water as the dispersing medium or to use a liquid medium where water is the major component. The pressure of the process is not critical so long as a liquid phase is maintained and can range from about 1 up to about 217 atmospheres. The process can be conducted at autogenous pressure or the pressure can be adjusted to exceed the vapor pressure of the liquid medium at the operating temperature. Most generally, with aqueous dispersions the pressure will range from about 5 to 120 atmospheres.

To obtain suitable dispersions with the olefin copolymers, one or more dispersing agents are employed for the process. Useful dispersing agents are nonionic surfactants which are block copolymers of ethylene oxide and propylene oxide. Preferably, these nonionic surfactants are water-soluble block copolymers of ethylene oxide and propylene oxide and have molecular weights greater than about 3500. Most will contain a major portion by weight of ethylene oxide and are obtained by polymerizing ethylene oxide onto preformed polyoxypropylene segments. The amount of nonionic surfactant employed can range from about 4 to 50 percent, based on the weight of the olefin copolymer. Most preferably, the nonionic surfactant is present from about 7 to 45 percent, based on the weight of the polymer.

Useful nonionic surface active agents of the above type are manufactured and sold by BASF Corporation, Chemicals Division under the trademark Pluronic. These products are obtained by polymerizing ethylene oxide on the ends of a preformed polymeric base of polyoxypropylene. Both the molecular weight of the polyoxypropylene base and the polyoxyethylene segments can be varied to yield a wide variety of products. One such compound found to be suitable for the practice of the process of this invention is the product designated as F-98 wherein a polyoxypropylene of average molecular weight of 2,700 is polymerized with ethylene oxide to give a product of molecular weight averaging about 13,500. This product contains 20 weight percent propylene oxide and 80 weight percent ethylene oxide. Other effective Pluronic® surfactants include F-88 (M.W. 11,250, 20% propylene oxide, 80% ethylene oxide), F-108 (M.W. 16,250, 20% propylene oxide, 80% ethylene oxide), and P-85 (M.W. 4,500, 50% propylene oxide, 50% ethylene oxide). These compounds, all containing at least about 50 weight percent ethylene oxide and having molecular weights of at least 4,500, are highly effective as dispersing agents for the aforementioned olefin copolymers.

It is also possible to employ products sold under the trademark Tetronic which are prepared by building propylene oxide block copolymer chains onto an ethylenediamine nucleus and then polymerizing with ethylene oxide. Tetronic ® 707 and Tetronic ® 908 are most effective for the present purposes. Tetronic ® 707 has a 30 weight percent polyoxypropylene portion, of 2,700 molecular weight, polymerized with a 70 weight percent oxyethylene portion to give an overall molecular weight of 12,000. Tetronic ® 908, on the other hand, has a 20 weight percent polyoxypropylene portion, of 2,900 molecular weight, polymerized with an 80 weight percent oxyethylene portion to give an overall molecular weight of 27,000. In general, useful Tetronic ® surfactants have molecular weights above 10,000 and contain a major portion by weight of ethylene oxide.

The powder-forming process may also be conducted in a continuous manner. If continuous operation is desired, the ingredients are continuously introduced to the system while removing the dispersion from another part of the system. The ingredients may be separately charged or may be combined for introduction to the autoclave.

Olefin copolymers containing randomly copolymerized or grafted unsaturated alkoxysilane is necessarily employed to obtain the crosslinkable powders of the invention. More specifically, the olefin copolymers are comprised of $\alpha$-olefins having from 2 to 8 carbon atoms and unsaturated alkoxysilanes of the formula

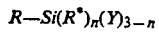

$$R-Si(R^*)_n(Y)_{3-n}$$

where R is an ethylenically unsaturated hydrocarbon radical having from 2 to 6 carbon atoms, $R^*$ is a hydrocarbon radical having from 1 to 10 carbon atoms, Y is an alkoxy group having from 1 to 4 carbon atoms and n is an integer from 0 to 2. The olefin copolymers must be readily dispersible in the liquid medium employed for the process. The olefin copolymers will therefore have melt flow rates greater than 1, and more typically greater than about 3. While the melt index may range as high as 500, it generally does not exceed about 300 and, more preferably, will be less than 100.

Random copolymers of ethylene and unsaturated alkoxysilanes, such as vinyltrialkoxysilanes, are known. Such copolymers can be obtained in accordance with any of the recognized procedures such as those described in U.S. Pat. Nos. 3,225,018 and 3,392,156. Generally, these copolymerizations are carried out at high pressure and temperature in the presence of a free radical initiator. Copolymers wherein an unsaturated alkoxysilane is grafted onto an olefin polymer backbone are also known and can be prepared in accordance with conventional procedures. Free radical initiators, such as peroxides, are generally used to facilitate grafting alkoxysilanes onto the polyolefins.

The unsaturated alkoxysilane will constitute from about 0.25 to 20 percent by weight and, more preferably, from about 0.5 to 10 percent by weight of the olefin copolymer. In a highly useful embodiment of this invention, the unsaturated alkoxysilane is a vinyltrialkoxysilane, i.e., where R is a Vinyl group and n is 0. It is especially advantageous to utilize vinyltrimethoxysilane or vinyltriethoxysilane, i.e., where R is a vinyl group, n=0 and Y is methoxy or ethoxy, respectively. Olefin copolymers derived from $C_{2-3}$ α-olefins are especially useful. Minor amounts of higher olefins may be present, particularly if the unsaturated alkoxysilane is grafted. While polyethylene is most commonly grafted, copolymers of ethylene with propylene, butene-1 and hexene-1 are also suitable. When the α-olefin and unsaturated alkoxysilane are copolymerized, ethylene is preferably employed particularly when the alkoxysilane is vinyltrimethoxysilane or vinyltriethoxysilane. When the olefin copolymer is comprised of an α-olefin and unsaturated alkoxysilane only, the α-olefin will constitute from 80 to 99.75 weight percent and, more preferably, 90 to 99.5 weight percent of the polymer.

One or more other monomers may be included with α-olefin and unsaturated alkoxysilane. Such comonomers include vinyl esters of $C_{2-6}$ aliphatic carboxylic acids, $C_{1-6}$ alkyl acrylates, and $C_{1-6}$ alkyl methacrylates. The comonomers can be copolymerized with the unsaturated alkoxysilane and α-olefin or the unsaturated alkoxysilane can be grafted onto a copolymer form by copolymerizing an α-olefin and the comonomer. When comonomers are present, the olefin copolymer will comprise 55 to 99.5 percent α-olefin, 0.25 to 20 percent unsaturated alkoxysilane and 0.25 to 45 percent comonomer(s). More commonly, the copolymers will contain 55 to 99 percent α-olefin, 0.5 to 40 percent unsaturated alkoxysilane and 0.5 to 40 percent comonomer. Preferred vinyl esters of $C_{2-6}$ aliphatic carboxylic acids include vinyl acetate and vinyl butyrate. Ethyl acrylate and n-butyl acrylate are particularly useful $C_{1-6}$ alkyl acrylate comonomers. Ethyl methacrylate is a particularly useful $C_{1-6}$ alkyl methacrylate comonomer.

The microfine olefin copolymer powders obtained will have 80 percent or more of the particles ranging in size from 10 microns to 500 microns. In an especially useful embodiment, the particle size will range from 20 to 300 microns. To produce powders of the desired particle size, a dispersion having droplets of the desired size must be formed. This requires proper selection of the operating conditions, such as, temperature and agitation, as well as proper selection of the dispersing agent (surfactant) to coat the droplets. The temperature of the dispersion is then lowered to below the melting temperature of the olefin copolymer and the polymer is separated from the liquid phase by filtration, centrifugation, decantation, evaporation, or the like. In a highly useful embodiment of the invention, the temperature of the dispersion is lowered to below the boiling point of the water or other o liquid medium and the finely divided polymer is recovered by atmospheric or vacuum-assisted filtration. The cooling may be accomplished by removing the heating source and allowing the mixture to cool or the hot dispersion may be rapidly quenched by mixing with cold liquid which is not a solvent for the polymer, This liquid maybe the same or different than that employed as the dispersing medium. Water is preferably used for this purpose.

The polymer powder may be washed and/or dried before being subjected to the crosslinking operation; however, this is not necessary. The powder may be crosslinked as it is obtained from the powder-forming process. For example, if the powder is recovered using the quenching procedure, it may be advantageously crosslinked while suspended in all or a portion of the quenching medium.

To crosslink the resulting olefin copolymer powders and effect reduction of the melt flow rates, the powders are contacted with water in the presence of a silanol condensation catalyst. If the powders are dried after the powder-forming operation, they are suspended in an aqueous medium containing the condensation catalyst. If, however, the powder is used directly as it is obtained from the quenching step, the catalyst may simply be added to this mixture and additional water added if desired.

The amount of water required for crosslinking can be varied over wide limits. Small amounts of water may be used since, in theory, each molecule of water can produce one crosslink site. On the other hand, large excesses on the order of 100 or more parts water per part olefin copolymer can be used. Such large volumes of water are not necessary, however, and can present handling and disposal problems. Generally, the weight ratio water to Olefin copolymer powder will range from 0.001:1 to 20:1 and, more preferably, from 0.01:1 to 5:1. One or more other organic liquids may be included with the water. These organic liquids should be miscible with water and cannot be a solvent for the polymer. Such liquids include alcohols, polyols, ketones, aldehydes, carboxylic acids, carboxylic acid esters and the like. If a carboxylic acid is employed with water as the suspending medium, it can also serve as the crosslinking catalyst. The organic liquids should not excessively swell or soften the powders as this will cause the powder particles to agglomerate. As a practical matter, the organic liquid will also generally have a boiling point above the operating temperature used for the crosslinking. If an organic liquid is present with the water, the ratio of water to organic liquid can range from about 99:1 to about 1:99.

While the olefin copolymer powders can be crosslinked under ambient conditions it is more customary to carry out the crosslinking at an elevated temperature. The temperature can range up to just below the melt point of the olefin copolymer; however, if the temperature is above the boiling point of water or other liquids present, use of a condenser or pressure vessel is necessary. Generally, the crosslinking and melt flow reduction will be carried out at a temperature from ambient up to about 110° C. and, more preferably, from 50° C. to 100° C.

While it is not necessary to employ a surfactant in the crosslinking step, surfactants or dispersants may be included in the aqueous medium if desired. If a surfactant is used it may be the same or different than the surfactant used in the powder-forming operation. Residual surfactant resulting from the powder-forming operation can be utilized for this purpose or other surfactants may be employed. In continuous processes, the first wash of the powder produced in the powder-forming step which will contain the bulk of the surfactant may be recycled and the powder and any residual surfactant can be fed to a downstream vessel where the crosslinking reaction will be carried out. After crosslinking, the powder can be washed to then remove final traces of surfactant and catalyst residues.

A silanol condensation catalyst is necessarily employed to crosslink the powders. These catalysts generally include organic bases, mineral acids, $C_{2-22}$ carboxylic acids or anhydrides, organic titanates and complexes or carboxylates of lead, cobalt, iron, nickel, zinc and tin. Lauryl amine, acetic acid, azelaic acid, lauric acid, palmitic acid, stearic acid, maleic acid, maleic anhydride, dibutyltin dilaurate, dibtyltin maleate, dibutyltin diacetate, dibutyltin dioctoate, stannous acetate, stannous octoate, lead naphthenate, zinc caprylate, and cobalt naphthenate are illustrative of the catalysts which can be used. Dialkyl tin carboxylates, especially dibutyltin dilaurate and dibutyltin maleate, and $C_{2-18}$ aliphatic monocarboxylic acids, especially acetic acid and stearic acid, are highly effective crosslinking catalysts for this invention.

The amount of catalyst used can vary over wide limits depending on the catalyst and olefin copolymer used and since, in some instances, the catalyst can also serve as the suspending medium. Where the catalyst also functions as the suspending medium, such as in the case of certain carboxylic acids, it can constitute up to as high as 90 percent of the total suspension mixture. In most instances where the catalyst is not part of the suspending medium, the catalyst will typically constitute from 0.01 percent up to about 5 percent of the total mixture. More commonly, the silanol condensation catalysts comprise from about 0.1 to 1 percent of the suspension.

The following examples illustrate the process of the invention and the crosslinkable powders obtained therefrom more fully. As will be apparent to those skilled in the art, numerous variations are possible and are within the scope of the invention. In the examples all parts and percentages are given on a weight basis unless otherwise indicated.

The powders produced in these examples were analyzed using laser light scattering to determine average particle size and particle size distribution. A Model 2600C. Malvern Particle Size Analyzer with the proper lens configuration for the expected particle size to be measured and equipped to automatically calculate the distribution curve and average particle size was used. For the analysis, water is charged to the water bath and circulated through the sample measuring chamber. After obtaining the baseline measurement, the agitator and sonic vibrator are turned on and powder is added to the water bath until the obscuration reading is 0.3. Mixing and circulation are controlled to obtain acceptable dispersion without excessive foaming. A drop of liquid detergent is added to facilitate dispersion. After eight minutes agitation, measurements are taken over a period of time and the distribution curve and average particle size are calculated. Duplicate runs are made for each powder sample. The particle size reported in the examples is the number average particle size D(v, 0.5). The range reported for the particle size distribution in the examples is for 80 percent of the distribution curve, i.e., 10 percent of the powder particles will fall below the lower limit of the recited distribution and 10 percent will be larger than the upper recited particle size distribution limit.

Melt flow rates provided in the examples were measured in accordance with ASTM D1238-89 at 190° C. With a Tinius Olsen Extrusion Plastometer. Melt flow rates are expressed in grams per 10 minutes.

EXAMPLE I

Preparation of ethylene-vinyltriethoxysilane copolymer powder: A crosslinkable microfine powder was produced in accordance with the dispersion procedure described in U.S. application Ser. No. 784,862 pending. To produce the powder, an electrically heated two-liter Paar reactor equipped with a thermowell and thermocouple connected to a digital display was used. The reactor was equipped with an agitator having three six-bladed impellers driven by a drill press equipped with a 2 HP DC variable speed motor. Three hundred and forty seven parts of a random copolymer of ethylene and vinyltriethoxysilane having a melt flow rate of 4.1 and containing 4.1% vinyltriethoxysilane was charged to the autoclave with 810 parts deionized water and 97.2 parts nonionic surfactant. The nonionic surfactant employed was Pluronic ® F-98 - a block copolymer of ethylene oxide and propylene oxide of molecular weight 1350 and containing 20% propylene oxide. The autoclave was sealed and heated over a period of 45 minutes up to 222° C. which resulted in a pressure of 340 psi. Agitation was commenced and maintained for 15 minutes at 3300 rpm (tip speed 2750 ft/min). The contents of the reactor were then rapidly discharged through a Strahman valve into a stainless steel tank containing 5 liters of cold water to precipitate the polymer. The resulting ethylene-vinyltriethoxysilane copolymer powder was washed several times with water, collected by filtration and dried. The powder had a melt flow rate of 3.06 and number average particle size of 141 microns. The particle size distribution ranged from 83 to 258 microns. Microscopic examination of the powder showed the powder particles to be spherically shaped.

EXAMPLE II

To demonstrate the ability to crosslink the olefin copolymer powders of the invention to reduce the melt flow rate, 100 parts of the dry powder of ethylene vinyltriethoxysilane copolymer powder produced in Example I was combined with 300 parts deionized water and 25 parts glacial acetic acid. The powder was suspended in the liquid medium by stirring with a magnetic stirrer while heating the mixture at 70° C. for 1½ hours. After this period, the polymer was recovered by filtration, washed several times with water and dried. The melt flow rate of the dried powder was reduced from 3.06 to 1.66 as a result of this treatment.

EXAMPLE III

To further illustrate the ability to crosslink the olefin copolymer powders and the ability to produce fractional melt flow rate polymer powders, 25 parts of the ethylenevinyltriethoxysilane copolymer powder of Example I was suspended in 200 parts glacial acetic acid. The mixture was stirred for 1½ hours while maintaining the temperature at 70°–80° C. The resulting crosslinked powder had no measurable melt flow, i.e., melt flow rate of zero. Furthermore, this significant reduction in melt index was accomplished without significantly altering the powder characteristics. The average particle size of the crosslink powder was 153 microns and particle size distribution ranged from 88 to 261 microns, essentially comparable to the starting specifications of the powder. The powder particles retained their spherical shape after the melt flow reduction.

EXAMPLE IV

To demonstrate the ability to crosslink the polymer powders using other catalysts, 50 parts of the olefin copolymer powder of Example I and 2.5 parts stearic acid were combined with 300 parts deionized water. The mixture was stirred for 1½ hours at a temperature of 70°–80° C. The resulting powder, after washing with ethanol and drying, had an average particle size of 148 microns and particle size distribution from 83 to 254 microns. Whereas the original powder had a melt flow rate of 3.06, the powder after the above treatment had no measurable flow.

EXAMPLE V

The versatility of the process is further demonstrated by the following experiment wherein the conditions were varied. For the reaction, 40 grams dry ethylenevinyltriethoxysilane copolymer powder (melt index 1.7, 4.1% VTEOS) was charged to an 800 ml resin flask containing 50 grams acetone and 150 grams deionized water. The resin flask was equipped with a reflux condenser, thermometer and agitator driven by an electric motor (Gerald Heller GT-21 with controller). The stirred suspension was heated to about 50° C. and 0.8 gram dibutyltinlaurate dissolved in 100 grams acetone added. After stirring the mixture at 50°–52° C. for 1½ hours, the suspension was cooled and the crosslinked powder was recovered by filtration. The powder was washed three times by resuspending in acetone, agitating and refiltering. The dried powder had no measurable melt flow rate. Average particle size of the powder was 141 microns and particle size distribution was 80–240 microns.

EXAMPLE VI

In a manner similar to that of Example V, 20 grams of EVTEOS copolymer was suspended in solution of 188 grams ethylene glycol and 2 grams deionized water. The mixture was heated to 80° C. with agitation and a solution of 2 grams laurylamine in 10 grams ethylene glycol added. The mixture was then stirred at 80°–85° C. for 1½ hours. Cold deionized water was added and the mixture was filtered to recover the powder. The product was washed by resuspending in water (2×) and (2×). The dried powder had a melt index of 0.012, an average particle size of 127 microns and particle size distribution of 60–221 microns.

We claim:

1. A crosslinkable microfine olefin copolymer powder having a melt flow rate greater than 1 produced in an aqueous dispersion process and comprised of particles which are spherical or substantially spherical in shape with 80 percent or more of the particles ranging in size from 10 microns to 500 microns, said olefin copolymer comprised of 80 to 99.75 weight percent f an α- olefin having from 2 to 8 carbon atoms and 0.25 to 20 weight percent of an unsaturated alkoxysilane of the formula

$$R-Si(R^*)_n(Y)_{3-n}$$

where R is an ethylenically unsaturated hydrocarbon radical having from 2 to 6 carbon atoms, R* is a hydrocarbon radical having from 1 to 10 carbon atoms, Y is an alkoxy group having from 1 to 4 carbon atoms and n is an integer from 0 to 2.

2. The olefin copolymer powder of claim 1 wherein the unsaturated alkoxysilane is a vinyltrialkoxysilane wherein R is vinyl, n is zero and Y is an alkoxy group having from 1 to 4 carbon atoms.

3. The olefin copolymer powder of claim 2 having a melt flow rate from 3 to 300 and wherein 80 percent or more of the particles range in size from 20 microns to 300 microns.

4. The olefin copolymer powder of claim 3 which is comprised of 90 to 99.5 weight percent $C_{2-3}$ α-olefin and 0.5 to 10 weight percent vinyltrialkoxysilane.

5. The olefin copolymer powder of claim 4 which has a melt flow rate from 3 to 100.

6. The olefin copolymer powder of claim 4 which is a random copolymer of ethylene and vinyltriethoxysilane.

7. The olefin copolymer powder of claim 4 which is a graft copolymer of vinyltriethoxysilane onto an ethylene polymer.

8. The olefin copolymer powder of claim 4 which is a random copolymer of ethylene and vinyltrimethoxysilane.

9. The olefin copolymer powder of claim 4 which is a graft copolymer of vinyltrimethoxysilane onto an ethylene polymer.

* * * * *